(12) United States Patent
Jacobs

(10) Patent No.: US 9,400,117 B2
(45) Date of Patent: Jul. 26, 2016

(54) DOUBLE-CLIP APPARATUS FOR RADIANT FLOOR HEAT SYSTEM

(71) Applicant: Gary L. Jacobs, Bennington, NE (US)

(72) Inventor: Gary L. Jacobs, Bennington, NE (US)

( * ) Notice: Subject to any disclaimer, the term of this patent is extended or adjusted under 35 U.S.C. 154(b) by 0 days.

(21) Appl. No.: 14/591,452

(22) Filed: Jan. 7, 2015

(65) Prior Publication Data

US 2015/0204549 A1    Jul. 23, 2015

Related U.S. Application Data

(60) Provisional application No. 61/928,494, filed on Jan. 17, 2014.

(51) Int. Cl.
| | |
|---|---|
| *F24D 3/14* | (2006.01) |
| *F16L 3/237* | (2006.01) |
| *F16M 11/10* | (2006.01) |
| *B60R 11/00* | (2006.01) |
| *H02G 3/30* | (2006.01) |
| *F16L 3/02* | (2006.01) |

(52) U.S. Cl.
CPC ............... *F24D 3/141* (2013.01); *B60R 11/00* (2013.01); *F16L 3/02* (2013.01); *F16L 3/237* (2013.01); *F16M 11/10* (2013.01); *H02G 3/30* (2013.01)

(58) Field of Classification Search
CPC ........ A62B 25/00; A62C 13/78; B60R 11/00; F16M 13/02; F16M 11/041; F16L 3/00; F16L 3/04; F16L 3/02; F16L 3/06; F16L 3/08; F16L 3/2235; F16L 3/223; F16L 3/227; F16L 3/23; F16L 3/237; H02G 3/22; H02G 3/30

USPC ............... 248/65, 67.7, 68.1, 73, 74.2, 72, 58
See application file for complete search history.

(56) References Cited

U.S. PATENT DOCUMENTS

| | | | | |
|---|---|---|---|---|
| 3,894,706 | A | * | 7/1975 | Mizusawa ............. F16L 3/1025 248/68.1 |
| 4,395,009 | A | * | 7/1983 | Bormke .................. H02G 3/32 174/157 |
| 5,085,384 | A | * | 2/1992 | Kasubke ................. F16L 3/221 248/62 |
| 5,156,491 | A | | 10/1992 | Russell |
| 5,577,697 | A | * | 11/1996 | Accordino ............. F16M 13/02 248/206.5 |
| 5,598,682 | A | | 2/1997 | Haughian |
| 2012/0061529 | A1 | * | 3/2012 | Hill .......................... H01R 4/48 248/65 |

OTHER PUBLICATIONS

RHT PEX Pipe Holders, BlueRidge Company, Dec. 5, 2013, Found online at: www.blueridgecompany.com/radiant/hydronic/502/rht-pex-pipe-holders, 3 pages.
Radiant Floor Heating, PEX Piping, Infloor Heat, BlueRidge Company, Dec. 5, 2013, Found online at:: www.blueridgecompany.com/image/child/3572, 1 page.

* cited by examiner

*Primary Examiner* — Nkeisha Smith
(74) *Attorney, Agent, or Firm* — Suiter Swantz pc llo

(57) ABSTRACT

An apparatus may include a first clip configured to receive a first portion of radiant heat tubing, a second clip configured to receive a second portion of radiant heat tubing, and an interconnecting brace. The interconnecting brace is connected to a base portion of the first clip and a base portion of the second clip, wherein the interconnecting brace is at least 3 inches long.

14 Claims, 6 Drawing Sheets

DOUBLE-CLIP APPARATUS FOR RADIANT FLOOR HEAT SYSTEM

CROSS-REFERENCE TO RELATED APPLICATIONS

The present application claims the benefit under 35 U.S.C. §119(e) of U.S. Provisional Application Ser. No. 61/928,494, filed Jan. 17, 2014. U.S. Provisional Application Ser. No. 61/928,494 is herein incorporated by reference in its entirety.

TECHNICAL FIELD

Embodiments of the invention are directed generally to apparati associated with the installation or hanging of piping or tubing in mechanical or plumbing systems.

BACKGROUND

Existing methods of installing a PEX tubing radiant heat system with proper spacing between tubing often involves attaching individual J-hooks (e.g., an individual J-hook for the supply side of a circuit and an individual J-hook for the return side of a circuit) with nails, individual tube talons with nails or screws, or individual staples. Such existing methods of installing a radiant heat system with proper tube spacing involve measuring the spacing between each mount point where each J-hook, tube talon, or staple is attached. Furthermore, such existing methods of installing a radiant heat system with proper tube spacing fail to ensure consistent and accurate tube spacing and require significant labor to implement every individual mount point with overhead hammering or screwing. Additionally, such existing methods are prone to loose screws, nails, or other parts being mishandled and falling during the installation process.

Therefore, it would be desirable to provide an apparatus configured to reduce the cost and time to install a radiant heat system and configured to increase the accuracy in tube spacing, and likewise, improve the design efficiency as a result of more accurate tube spacing.

SUMMARY

Accordingly, an embodiment includes an apparatus. The apparatus may include a first clip configured to receive a first portion of radiant heat tubing, a second clip configured to receive a second portion of radiant heat tubing, and an interconnecting brace. The interconnecting brace is connected to a base portion of the first clip and a base portion of the second clip, wherein the interconnecting brace is at least 3 inches long.

Additional embodiments are described in the application including the claims. It is to be understood that both the foregoing general description and the following detailed description are exemplary and explanatory only and are not restrictive. Other embodiments will become apparent.

BRIEF DESCRIPTION OF THE DRAWINGS

Other embodiments of the invention will become apparent by reference to the accompanying figures in which.

DETAILED DESCRIPTION

Reference will now be made in detail to the subject matter disclosed, which is illustrated in the accompanying drawings. The scope of embodiments of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

Figure 1:
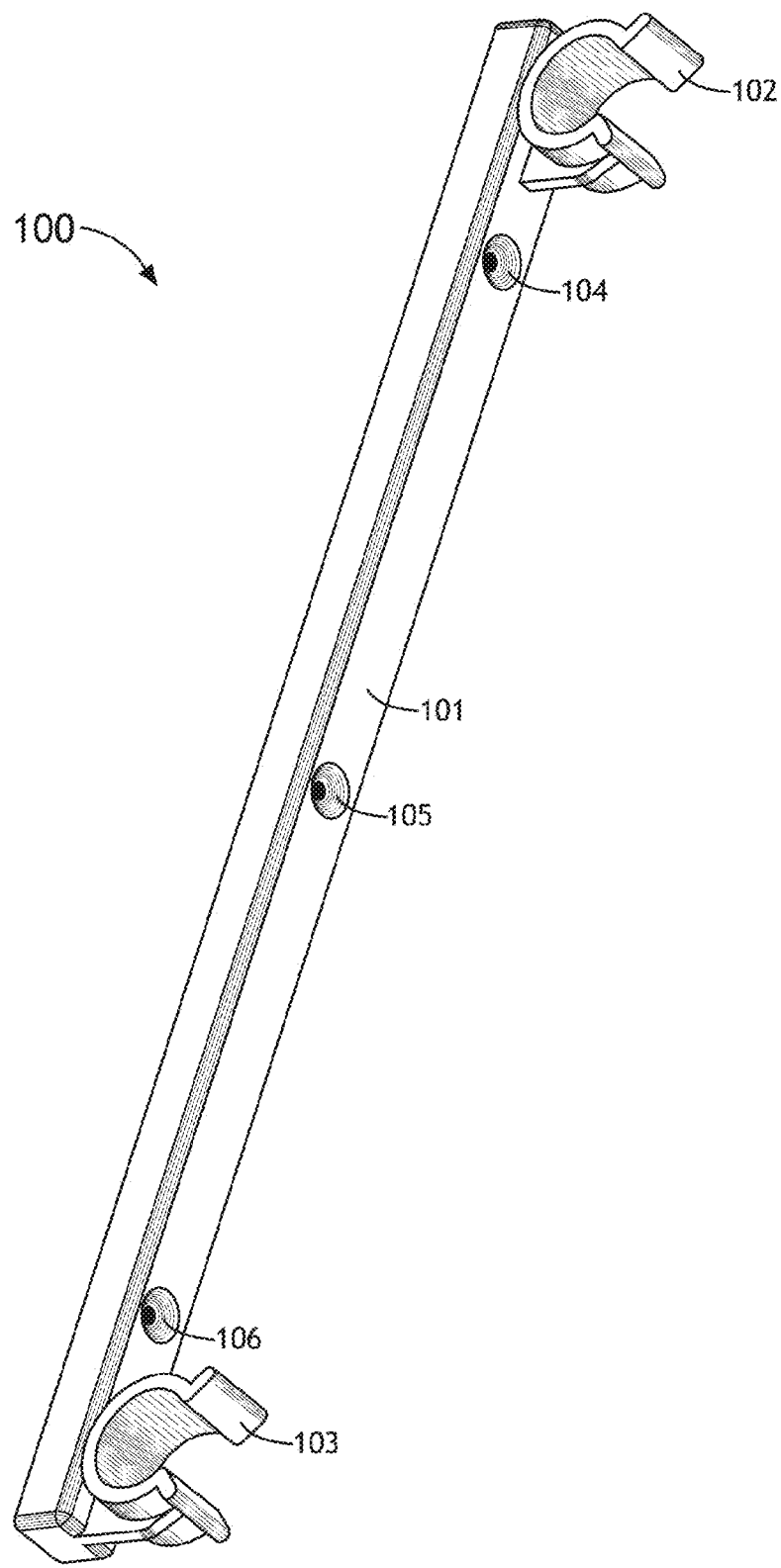
FIG. 1 shows a view of an exemplary embodiment of the invention.
Figure 2:
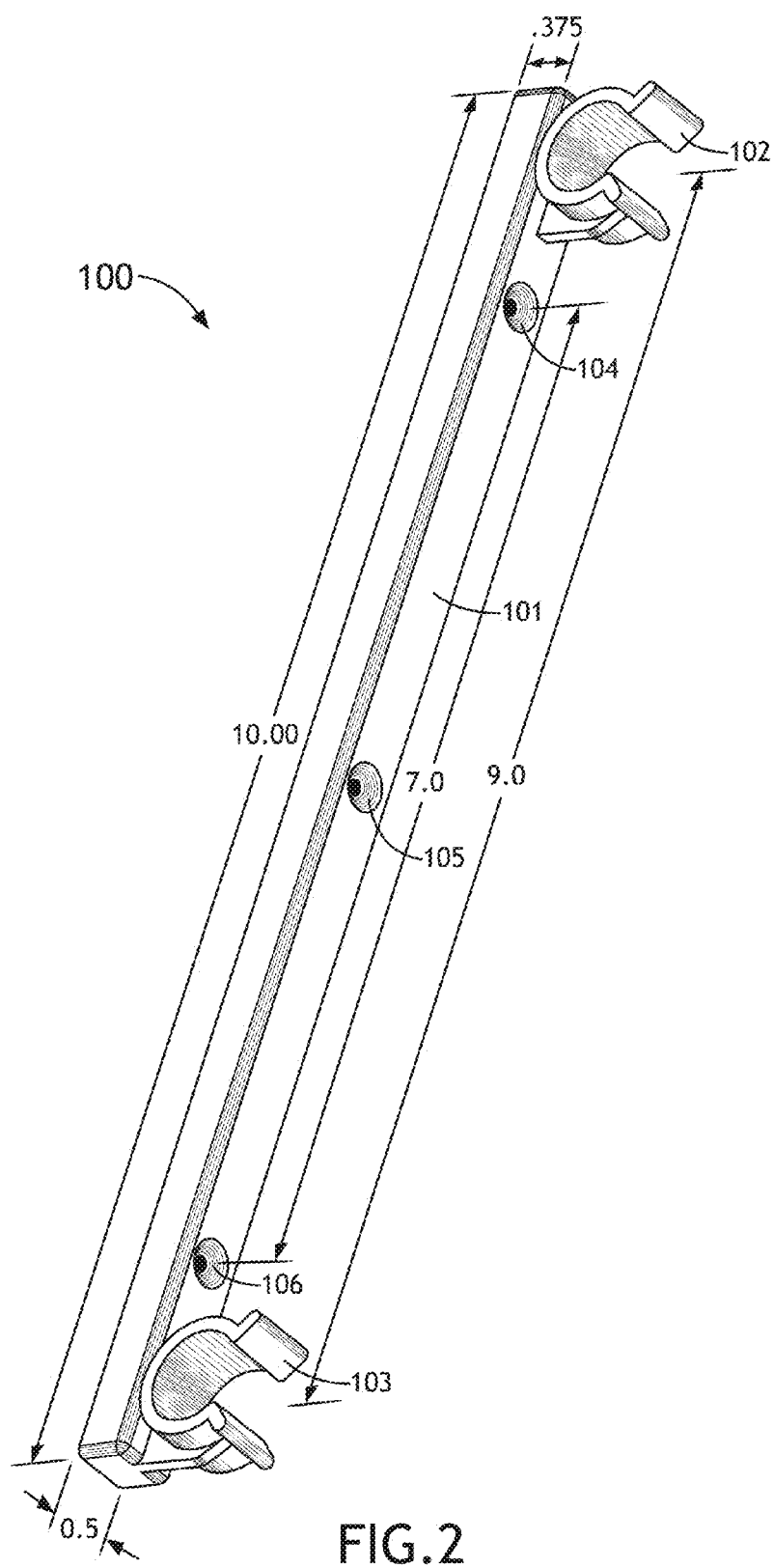
FIG. 2 shows a view with exemplary dimensions of an exemplary embodiment of the invention.
Figure 3:
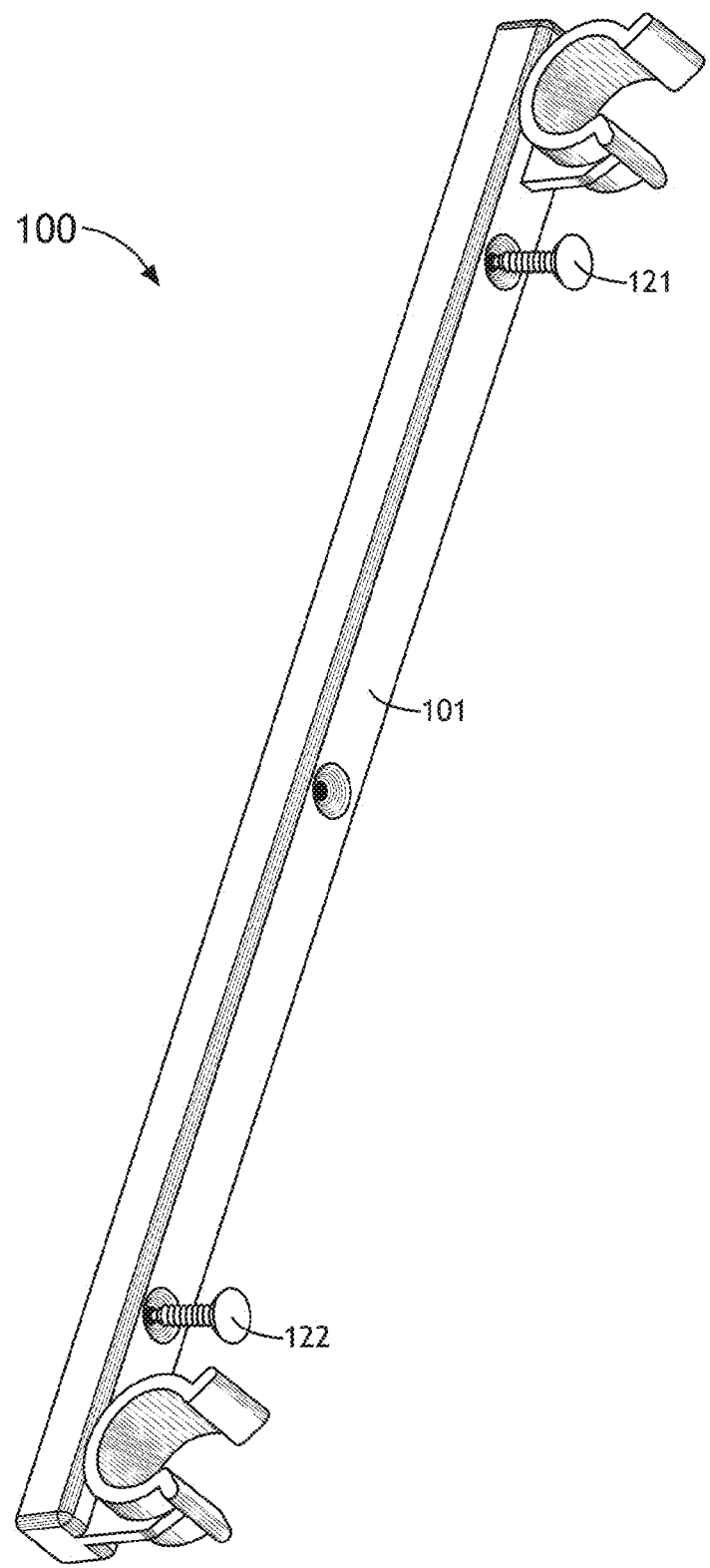
FIG. 3 shows a view of an exemplary embodiment of the invention with pre-loaded screws.
Figure 4:
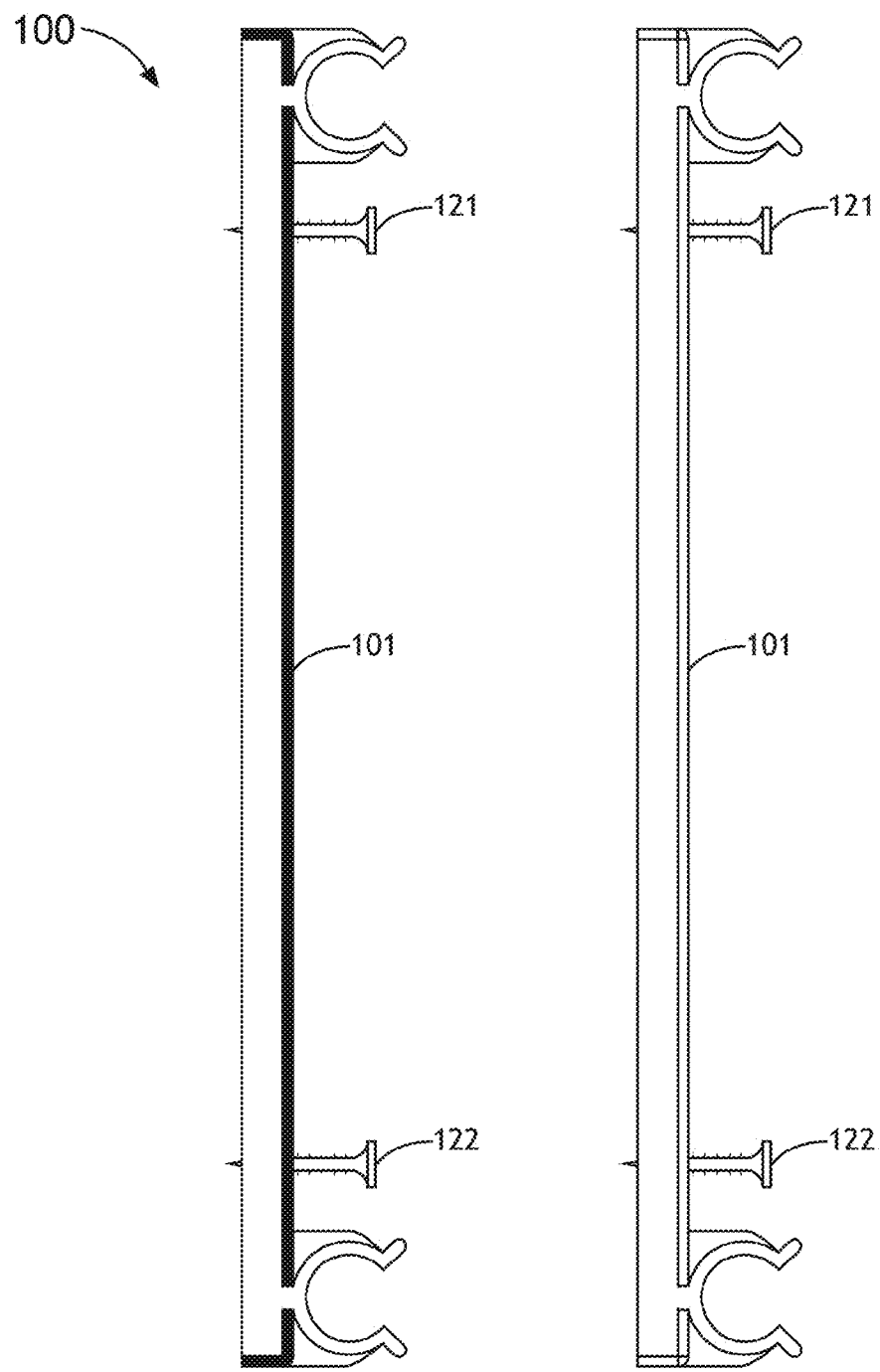
FIG. 4 shows a side view of two embodied apparati with pre-loaded screws.
Figure 5:
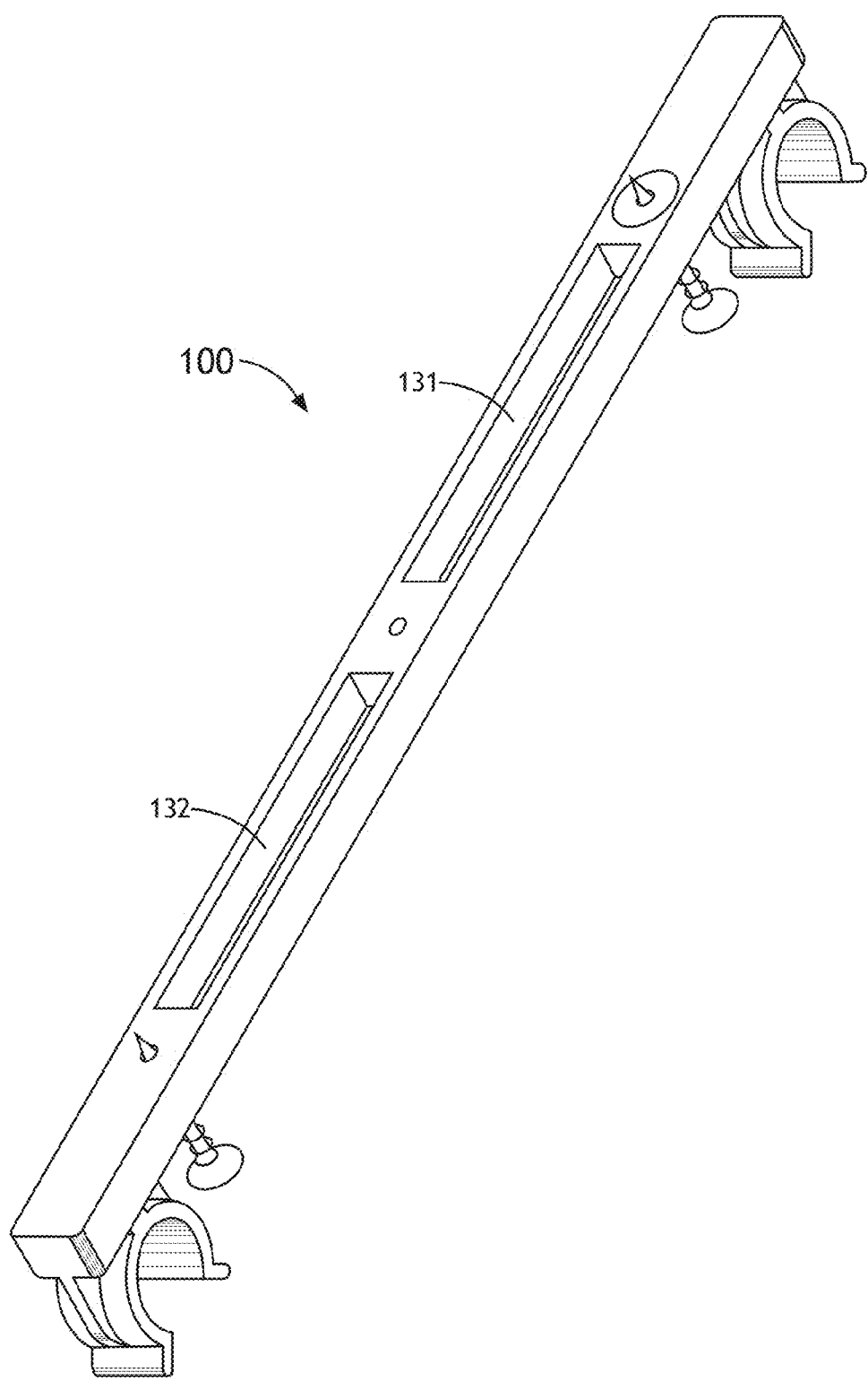
FIG. 5 shows a further isometric view of an exemplary embodiment of the invention with pre-loaded screws.

Referring now to FIGS. 1-6, exemplary embodiments of the apparatus 100 are shown. In some embodiments, each of the two clips 102, 103 are configured to hold a particular nominal pipe size (e.g., ¼ inch, ⅜ inch, ½ inch, ⅝ inch, ¾ inch, ⅞ inch, 1 inch, 1¼ inch, 1½ inch, 2 inch, larger than 2 inches, or the like nominal pipe size) of any suitable tubing type. In some embodiments, each of the two clips 102, 103 are configured to hold a particular nominal pipe size type (e.g., copper tube size (CTS), iron pipe size (IPS), or the like). In some embodiments, each of the two clips 102, 103 are configured and sized to hold a particular nominal pipe size type and a layer of surrounding insulation (e.g., mineral wool, glass wool, flexible elastomeric foam, ridged foam, polyethylene, cellular glass, silica aerogel, or the like). In some embodiments, suitable tubing type may include PEX tubing, copper tubing, iron pipe (e.g., malleable iron, or the like), steel pipe (e.g., stainless steel, carbon steel, or the like), polyvinyl chloride (PVC), chlorinated polyvinyl chloride (CPVC), ceramic tubing, other non-metallic tubing, other plastic tubing, other metal or metal alloy tubing, or the like. For example, embodiments of the invention may comprise a double-clip apparatus for a suspended tubing or suspended clip-up PEX tubing radiant heat system. Embodiments of the invention include two clips 102, 103 and an interconnecting brace 101, wherein a base portion of each of the two clips 102, 103 is connected to the interconnecting brace 101. In some embodiments, the apparatus 100 includes one or more mounting holes (e.g., 104, 105, 106); for example, in a particular embodiment the apparatus 100 includes three mounting holes, including a first end mounting hole 104, a center mounting hole 105, and second end mounting hole 106. In some embodiments, each of the mounting holes (e.g., 104, 105, 106) includes a recessed portion on the clip-side of the interconnecting brace 101, wherein each recessed portion is configured to accommodate a head of an inserted attachment means (e.g., a nail, a screw, or the like). That is, in some embodiments, one or more (e.g., each) of the mounting holes (e.g., 104, 105, 106) are countersunk; for example, in a particular exemplary embodiment, the wider top portion of the mounting holes (e.g., 104, 105, 106) may have a diameter of approximately 0.34 inches, and the narrower through-hole portion of the mounting holes (e.g., 104, 105, 106) may have a diameter of approximately 0.12 inches, though any suitable dimensions for the countersunk mounting holes (e.g., 104, 105, 106) may be used in other embodiments. As shown in FIGS. 3-5, in some embodiments, the two end mounting holes 104, 106 near the clips 102, 103 have screws 121, 122 (e.g., ¾-inch screws, one-inch screws, or the like) pre-placed or pre-loaded in the brace such that the screws 121, 122 do not fall out of the holes when the apparatus 100 is turned upside down or being installed. As shown in FIG. 5, in some embodiments, the apparatus 100 includes one or more cavities (e.g., two cavities 131, 132), which reduce the amount of material needed to manufacture the apparatus 100. Additionally, in some embodiments, each of the clips 102, 103 include or are reinforced with clip support structures 141, 142.

In some embodiments, the apparatus 100 is made of a polymer material or plastic material (such as polyethylene, a polyethylene blend, polypropylene, a polypropylene blend, or the like); however, the apparatus 100 may be made of any suitable material, such as metal (e.g., steel, copper, brass, aluminum, another alloy, or the like), wood, or the like. In some embodiments, the apparatus is manufactured as a molded plastic material (e.g., molded polyethylene, molded polypropylene, or the like), while in other embodiments the apparatus 100 is manufactured through a three-dimensional printing process. In some embodiments, the apparatus 100 is composed of a polypropylene; for example, in a particular embodiment, the apparatus is composed of Braskem D115A homopolymer polypropylene, which includes the following suitable properties: a maximum service temperature (air) of 149-257 degrees Fahrenheit; a heat distortion temperature of 185-239 degrees Fahrenheit; a brittleness temperature of −4 degrees Fahrenheit; and a melt temperature of 293-608 degrees Fahrenheit.

A particular exemplary embodiment of the invention includes an apparatus 100 comprising two clips (e.g., each clip being sized to fit one-half inch CTS (copper tube size)) which are pre-spaced on an interconnecting brace 101. In the particular exemplary embodiment, the interconnecting brace 101 has three mounting holes. As shown in FIG. 2, in some embodiments, the two clips 102, 103 are pre-spaced approximately nine inches on center (e.g., between 8.5 inches and 9.5 inches on center) along the interconnecting brace 101; the first end hole 104 and the second end hole 106 are spaced approximately 7 inches on center (e.g., between 6.5 and 7.5 inches on center); the interconnecting brace 101 is approximately 10 inches long (e.g., between 9.5 inches and 10.5 inches long); the width of the interconnecting brace 101 is approximately 0.5 inches wide (e.g., between 0.3 inches and 0.7 inches wide); and the interconnecting brace 101 is approximately 0.375 inches tall (e.g., between 0.2 inches and 0.7 inches tall). While FIG. 2 shows a particular exemplary embodiment having particular dimensions, it is fully contemplated that other embodiments may have different dimensions.

In some embodiments the two clips 102, 103 are pre-spaced in a particular distance apart in a range of between 3 inches and 15 inches on center along the interconnecting brace 101; the first end hole 104 and the second end hole 106 are spaced a particular distance apart in a range of between 1 inch and 13 inches on center; the interconnecting brace 101 is between 4 inches and 16 inches long; the width of the interconnecting brace 101 is between 0.3 inches wide and 1.5 inches wide; and the interconnecting brace 101 is between 0.2 inches tall and 1.5 inches tall. In some embodiments, the interconnecting brace is between 1 inch and 16 inches long, in other embodiments, the interconnecting brace is longer than 16 inches.

Figure 6:
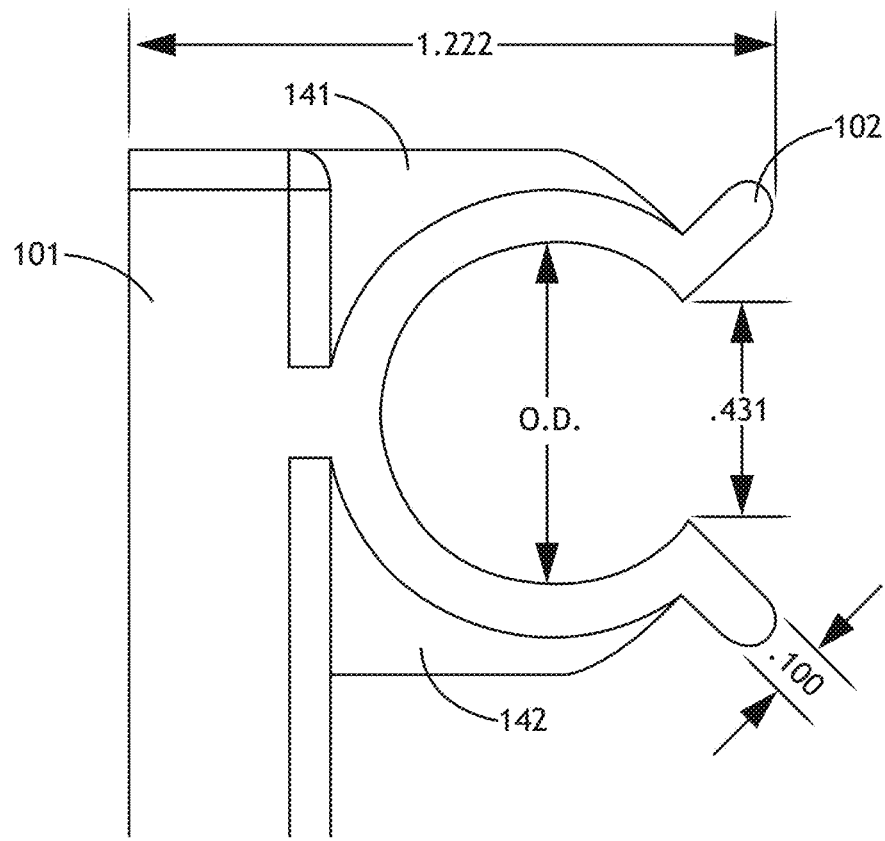
FIG. 6 shows a partial side view of a clip connected to an interconnecting brace of an embodiment of the invention.

Referring now to FIG. 6, embodiments of the invention include each of the two clips 102, 103 being sized according to a corresponding pipe size for which the two clips 102, 103 are configured to hold and accommodate. For example, in some embodiments, each of the two clips 102, 103 are configured to hold a particular nominal pipe size (e.g., ¼ inch, ⅜ inch, ½ inch, ⅝ inch, ¾ inch, ⅞ inch, 1 inch, 1¼ inch, 1½ inch, 2 inch, or the like nominal pipe size) of any suitable pipe/tubing type. In a particular embodiment, each clip is configured to hold a ½-inch PEX (cross-linked polyethylene) tubing, which may be manufactured to CTS-OD (copper tubing size, outside diameter controlled) specifications. For example, each of the two clips 102, 103 may be sized to fit the outside pipe diameter of a pipe or tube segment having a particular nominal pipe size. In some embodiments, the two clips 102, 103 are sized to have an interior diameter slightly larger (e.g., less than 5% larger, less than 10% larger, or the like) than the actual pipe size diameter for which the two clips 102, 103 are configured to hold; for example, for an exemplary nominal ½ inch size PEX pipe, which has an actual diameter of approximately 0.625 inches, the interior diameter of the two clips may be approximately 0.652 inches (e.g., 0.652 inches+/−0.12 inches). In some embodiments, the apparatus 100 has a height (as measured from the base of the interconnecting brace 101 to the top of a particular clip 102, 103) of between 1 inch and 2.5 inches, which may vary depending on the size of pipe that the apparatus 100 is configured to hold; for example, in a particular embodiment as shown in FIG. 6, the apparatus 100 is configured for ½ inch nominal pipe size pipe, and the apparatus has a height of approximately 1.222 inches (e.g., 1.222 inches+/−0.2 inches). In some embodiments, as shown in FIG. 6, each clip has an opening between two ends of each clip 102, 103 so that the pipe can be flexibly slid into the clip 102, 103. In some embodiments, the opening between two ends of each clip 102, 103 is suitably dimensioned; for example, in a particular embodiment, for a clip 102, 103 configured to receive a ½ inch nominal pipe size, the opening may be approximately 0.431 inches (e.g., 0.431 inches+/−0.1 inches). In some embodiments, where a clip 102, 103 is configured to receive a nominal pipe size pipe larger than ½ inch (e.g., a ¾ inch nominal pipe size), the opening may have a proportionally larger size; likewise, in some embodiments, where a clip 102, 103 is configured to receive a nominal pipe size pipe smaller than ½ inch (e.g., a ⅜ inch nominal pipe size), the opening may have a proportionally smaller size. In some embodiments, each clip 102, 103 has any suitable thickness; for example, in a particular embodiment as shown in FIG. 6, each clip 102, 103 has a thickness of approximately 0.100 inches (e.g., between 0.05 inches and 0.200 inches). In some embodiments, the thickness of each clip 102, 103 varies throughout portions of the clip 102, 103 in a predetermined manner to allow for a designed amount of flex or range of flex; however, in other embodiments, the clip thickness remains substantially uniform throughout the clip 102, 103 while still providing a suitable amount of flex or range of flex. Each clip 102, 103 may flex an acceptable amount (e.g., without breaking, cracking, or excessively stressing the clip structure) to accommodate piping or tubing as the piping or tubing is pushed and inserted into each clip 102, 103. In some embodiments, each clip 102, 103 is configured to hold radiant heat tubing while acting as a thermal expansion clip, which allows the radiant heat tubing the ability to slide with enough freedom within each clip 102, 103 to accommodate any thermal expansion or contraction of the radiant heat system that may occur during heat-up and cool-down cycles; moreover, embodiments, which include each clip 102, 103 being configured to hold radiant heat tubing while acting as a thermal expansion clip, prevent audible "creaking" or "ticking" of the radiant heat system caused by thermal expansion of the radiant heat system which would occur when the radiant tubing does not have the ability to freely expand at suspension or mount points. Furthermore, each clip is configured to surround a majority of a pipe or tube's circumference (e.g., between 51% and 90% of a pipe or tube's circumference).

While the clips 102, 103 are described as being configured to accommodate PEX or copper tubing, it is fully contemplated that the clips 102, 103 of the apparatus 100 may be configured to accommodate any tubing or piping suitable for a particular application.

Still referring to FIG. 6, in some embodiments, each of the clips 102, 103 include or are reinforced with clip support structures 141, 142.

Embodiments of the invention are configured for quick and easy installation. For example, the center mounting hole 105 can be used for fast installation with a pneumatic nailing gun; in other embodiments, screws 121, 122 may be easily installed in the first end hole 104 and the second end hole 106 with a battery-operated screw drill. As shown in FIGS. 3-5, in some embodiments, the two end mounting holes 104, 106 near the clips 102, 103 have screws 121, 122 (e.g., ¾-inch screws, one-inch screws, or the like) pre-placed or pre-loaded in the interconnecting brace 101 such that the screws 121, 122 do not fall out of the holes when the apparatus 100 is turned upside down or being installed. In some embodiments, advantages of the apparatus 100 allow the apparatus to be held with only one hand between floor joists while the apparatus is placed against the subfloor to be mounted in three-foot intervals for suspended tubing clip-up radiant floor heating.

Embodiments of the apparatus 100 may save 50 percent of the time normally used to install a clip-up radiant heat floor system and ensure consistent and accurate spacing between tubing lines. Embodiments of the apparatus 100 also are configured to hold PEX tubing a consistent distance below the subfloor (such as ½ inch or 1 inch below the subfloor), creating a desired and consistent air space for convection and providing space away from a subfloor and a finished floor so that separation of glued materials does not occur; the resulting airspace provided by embodiments of the invention ensures that in an exemplary operating range of between 85 degrees and 115 degrees Fahrenheit (feed water temperature) there is no damage to construction materials or overlaid floor materials. Additionally, the airspace also promotes even heating of the floor joist cavity between the subfloor and bubble foil insulation, and the airspace promotes an even surface temperature on the above finished floor thus providing an improvement over currently existing systems, which tend to overheat or cause heat-striping on the above finished floors. Furthermore, the resulting airspace provides a consistent temperature distribution across the above finished floor. Some embodiments of the invention further allow for expansion and contraction of piping without any noise because of physical properties of the polyethylene or polypropylene material of some embodiments of the apparatus 100.

In further applications, embodiments of the apparatus 100 may be used as a mounting bracket for installing hot and cold plumbing systems (e.g., hot and cold domestic water systems, chilled water systems, heating water systems, or the like) to pre-space the pipes and save installation time. In some embodiments, the apparatus 100 has a melt-point of over 400 degrees eliminating any risk of loosening of installed pipes in the clips 102, 103.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A subfloor mountable double-clip apparatus for a radiant floor heat system, comprising:
a first clip including a first clip support structure and a first clip portion, the first clip portion shaped to uninterruptedly surround a majority of a first circumferential portion of radiant heat tubing;
a second clip including a second clip support structure and a second clip portion, the second clip portion shaped to uninterruptedly surround a majority of a second circumferential portion of radiant heat tubing; and
an interconnecting brace including a first side and an opposite side being opposite the first side, the interconnecting brace being connected to the first clip support structure of the first clip and the second clip support structure of the second clip on the first side of the interconnecting brace, wherein the first clip support structure of the first clip is perpendicularly positioned between the interconnecting brace and the first clip portion, wherein the second clip support structure of the second clip is perpendicularly positioned between the interconnecting brace and the second clip portion, wherein the opposite side of the interconnecting brace includes at least two cavities, wherein the interconnecting brace is at least 3 inches long, the interconnecting brace including a flat surface opposite a side of the interconnecting brace that is connected to the first clip support structure and the second clip support structure such that the flat surface is configured to be positioned against a subfloor when the subfloor mountable double-clip apparatus for the radiant heat system is mounted to the subfloor, wherein the first clip is oriented with respect to the interconnecting brace so as to hold a portion of radiant heat tubing extending through the first clip in a direction at least substantially perpendicular to a lengthwise direction of the interconnecting brace, wherein the second clip is oriented with respect to the interconnecting brace so as to hold a portion of radiant heat tubing extending through the second clip in a direction at least substantially perpendicular to the lengthwise direction of the interconnecting brace,
wherein the interconnecting brace includes at least three holes positioned between the first clip and the second clip, each of the at least three holes positioned along the interconnecting brace at points along a line passing between the first clip support structure and the second clip support structure, each of the at least three holes configured to receive attachment means, the at least three holes including a first end mounting hole, a center mounting hole, and a second end mounting hole, wherein each of the at least three holes are countersunk,
wherein the flat surface opposite a side of the interconnecting brace that is connected to the first clip support structure and the second clip support structure of the interconnecting brace includes the at least two cavities including a first cavity positioned between the first end mounting hole and the center mounting hole and a second cavity positioned between the center mounting hole and the second end mounting hole,
wherein the first clip, the second clip, and the interconnecting brace are composed of a single piece of material.

2. The apparatus of claim 1, wherein the single piece of material is a single piece of plastic.

3. The apparatus of claim 2, wherein the plastic comprises polypropylene.

4. The apparatus of claim 1, wherein the first clip and the second clip are spaced between 8.5 inches and 9.5 inches on center.

5. The apparatus of claim 1, wherein the first clip and the second clip are spaced at least 8 inches on center.

6. The apparatus of claim 1, wherein the first clip and the second clip are spaced at least 11 inches on center.

7. The apparatus of claim 1, wherein the first clip and the second clip are spaced between 11.5 inches and 12.5 inches on center.

8. The apparatus of claim 1, wherein each of the attachment means comprises a screw, wherein two screws are pre-loaded into two of the at least three holes such that the each of the two screws is in mechanical equilibrium with the interconnecting brace unless acted on by an external force.

9. The apparatus of claim 1, wherein the interconnecting brace is approximately 0.5 inches tall.

10. The apparatus of claim 1, wherein the interconnecting brace is between 9.5 inches and 10.5 inches long.

11. The apparatus of claim 1, wherein the interconnecting brace is at least 4 inches long.

12. The apparatus of claim 1, wherein the subfloor mountable double-clip apparatus is shaped and configured to be mounted to the subfloor between floor joists in the radiant heat system such that an airspace is formed between the radiant heat tubing and the subfloor.

13. The apparatus of claim 1, wherein the single piece of material is a single piece of molded or three-dimensionally printed plastic having a melt temperature of at least 293 degrees Fahrenheit, a maximum service air temperature of at least 149 degrees Fahrenheit, and a heat distortion temperature of at least 185 degrees Fahrenheit.

14. A subfloor mountable double-clip apparatus for a radiant floor heat system, comprising:
- a first clip including a first clip support structure and a first clip portion, the first clip portion shaped to uninterruptedly surround a majority of a first circumferential portion of radiant heat tubing;
- a second clip including a second clip support structure and a second clip portion, the second clip portion shaped to uninterruptedly surround a majority of a second circumferential portion of radiant heat tubing; and
- an interconnecting brace including a first side and an opposite side being opposite the first side, the interconnecting brace being connected to the first clip support structure of the first clip and the second clip support structure of the second clip on the first side of the interconnecting brace, wherein the first clip support structure of the first clip is perpendicularly positioned between the interconnecting brace and the first clip portion, wherein the second clip support structure of the second clip is perpendicularly positioned between the interconnecting brace and the second clip portion, wherein the opposite side of the interconnecting brace includes at least one cavity, wherein the interconnecting brace is at least 3 inches long, the interconnecting brace including a flat surface opposite a side of the interconnecting brace that is connected to the first clip support structure and the second clip support structure such that the flat surface is configured to be positioned against a subfloor when the subfloor mountable double-clip apparatus for the radiant heat system is mounted to the subfloor, wherein the first clip is oriented with respect to the interconnecting brace so as to hold a portion of radiant heat tubing extending through the first clip in a direction at least substantially perpendicular to a lengthwise direction of the interconnecting brace, wherein the second clip is oriented with respect to the interconnecting brace so as to hold a portion of radiant heat tubing extending through the second clip in a direction at least substantially perpendicular to the lengthwise direction of the interconnecting brace,
- wherein the interconnecting brace includes at least two holes positioned between the first clip and the second clip, each of the at least two holes positioned along the interconnecting brace at points along a line passing between the first clip support structure and the second clip support structure, each of the at least two holes configured to receive attachment means,
- wherein the first clip, the second clip, and the interconnecting brace are composed of a single piece of material,
- wherein the subfloor mountable double-clip apparatus is shaped and configured to be mounted to the subfloor between floor joists in the radiant heat system such that an airspace is formed between the radiant heat tubing and the subfloor,
- wherein the at least two holes include at least three holes including a first end mounting hole, a center mounting hole, and a second end mounting hole, wherein each of the at least three holes are countersunk,
- wherein the flat surface opposite a side of the interconnecting brace that is connected to the first clip support structure and the second clip support structure of the interconnecting brace includes at least two cavities including a first cavity positioned between the first end mounting hole and the center mounting hole and a second cavity positioned between the center mounting hole and the second end mounting hole,
- wherein the single piece of material is a single piece of molded or three-dimensionally printed plastic having a melt temperature of at least 293 degrees Fahrenheit, a maximum service air temperature of at least 149 degrees Fahrenheit, and a heat distortion temperature of at least 185 degrees Fahrenheit,
- wherein the interconnecting brace is between 0.2 inches tall and 1.5 inches tall,
- wherein the first clip and the second clip are spaced between 8.5 inches and 12.5 inches on center.

* * * * *